United States Patent
Coffy

(10) Patent No.: US 7,609,890 B2
(45) Date of Patent: Oct. 27, 2009

(54) PACKING LIST VERIFICATION SYSTEM

(75) Inventor: Jean-Hiram Coffy, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 982 days.

(21) Appl. No.: 10/957,459

(22) Filed: Sep. 30, 2004

(65) Prior Publication Data

US 2006/0075340 A1    Apr. 6, 2006

(51) Int. Cl.
*G06K 9/00* (2006.01)

(52) U.S. Cl. .................. 382/187; 382/119; 235/472.03; 178/18.01; 178/19.01

(58) Field of Classification Search ................ 382/115, 382/119, 232, 187; 345/619, 179, 173; 706/46; 713/176, 186; 235/380, 454, 494, 375, 472.03, 235/462.49; 358/3.28; 283/113, 67, 94, 283/904, 57, 95; 380/51, 55; 340/5.86, 5.83; 178/18.01, 19.01

See application file for complete search history.

(56) References Cited

U.S. PATENT DOCUMENTS

| | | | | | |
|---|---|---|---|---|---|
| 4,839,634 | A | * | 6/1989 | More et al. | 345/173 |
| 5,029,223 | A | * | 7/1991 | Fujisaki | 382/187 |
| 5,212,769 | A | * | 5/1993 | Pong | 345/467 |
| 5,586,198 | A | * | 12/1996 | Lakritz | 382/185 |
| 5,724,457 | A | * | 3/1998 | Fukushima | 382/311 |
| 6,666,376 | B1 | * | 12/2003 | Ericson | 235/454 |
| 6,801,659 | B1 | * | 10/2004 | O'Dell | 382/185 |
| 7,024,016 | B2 | * | 4/2006 | Rhoads et al. | 382/100 |

* cited by examiner

*Primary Examiner*—Sheela C Chawan
(74) *Attorney, Agent, or Firm*—George M. Macdonald; Angelo N. Chaclas

(57) ABSTRACT

The present application describes systems and methods for real-time verification of form input using a digital pen. In one configuration, a user inputs data by checking or initialing boxes using a digital pen and then selects a complete indicator. The system then verifies that all required boxes have been checked and if they have not, the system provides real-time feedback to the operator.

19 Claims, 5 Drawing Sheets

PACKING LIST VERIFICATION SYSTEM

BACKGROUND

The illustrative embodiments described in the present application are useful in systems including those for providing verification of form input and more particularly are useful in systems including those for providing real-time verification and auditing of forms using a digital pointing device such as a digital pen.

Traditional paper based forms are used in many situations. In certain applications, a form is checked or initialed to indicate actions such as completion of a task or an indication of quality assurance. Typically, such a form will include pre-printed information and pre-printed boxes for data input. In using a traditional pre-printed form, the user fills in data input spaces using an ink pen.

In many manufacturing processes, the final operation before shipping involves assembling and packaging multiple component parts of a given system and placing them in a shipping container such as a cardboard box. While the operator may use a paper form to check off items as they are placed in a box, the operator may inadvertently skip a component and not notice the error.

In many order fulfillment processes, a pick and pack warehouse employee utilizes a paper checklist to ensure that all ordered items are picked from stock and packed into the shipping container. While the operator may use a paper form to check off items as they are placed in a box, the operator may inadvertently skip a purchased item and not notice the error. If the error is not noticed until the package reaches a downstream quality assurance station, the error is more costly to remedy. In large warehouse fulfillment operations, a Warehouse Management System (WMS) may be used. Typical WMS systems utilize automation systems including barcode systems, pick-to-light systems and voice recognition packing systems.

In another process that often utilizes paper forms, aircraft maintenance logs are often captured using a pen and checklist. Those maintenance checklists are then stored and may be audited at a later date.

A reference entitled Forms Automation System is shown in U.S. Pat. No. 5,563,999 issued Oct. 8, 1996 to Yaksich, et al. and is incorporated herein by reference.

Accordingly, the prior art does not provide a real-time system for verification of form input using a digital pen.

SUMMARY

Accordingly, it is an object of the present application to describe a system and method for providing a real-time form input verification system using a digital pen. The illustrative embodiments of the present application describe a real-time form input verification system using a digital pen.

In one illustrative embodiment, a user inputs data by checking or initialing boxes using a digital pen and then selects a complete indicator. The system then verifies that all required boxes have been checked and if they have not, the system provides real-time feedback to the operator.

In another embodiment, a maintenance operator inputs data by writing data and initialing the entries using a digital pen and then selects a complete indicator. The system then provides a real-time verification of the test and provides a test indication to a system user.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Illustrative systems and methods for providing a real-time form input verification system using a digital pen are described.

Digital pens allow a user to capture or digitize handwriting or pen strokes that the user writes on a medium such as a piece of paper by using a processor such as a personal computer. Certain digital pens utilize an imaging device to scan or record an image of the pen stroke. Certain other digital pens use mechanical sensors in order to record a pen stroke. The SONY-ERICSSON CHA-30 CHATPEN using digital paper having an ANOTO pattern is available from Anoto AB of Sweden and typically uses a pattern lookup server to identify a unique two-dimensional area of paper. The pen utilizes a BLUETOOTH transceiver in order to communicate with a processor and the ANOTO paper includes a grid encoding information such position information that is detected by the CHATPEN. Additional information may be captured including information related to pressure, speed and pen attitude. The additional information includes biometric information that may be used to identify or authenticate a user.

Additionally, a user identifier may be used to associate a user with a pen or a fingerprint sensor may be incorporated in the pen. In certain embodiments, a positioning system may be used to provide pen location data that can be associated with the pen stroke data. Furthermore, a date and time stamp for the pen strokes may be provided to a back-end processing system. The ANOTO pattern lookup service may be located remotely across a network or locally to the system.

Figure 1:
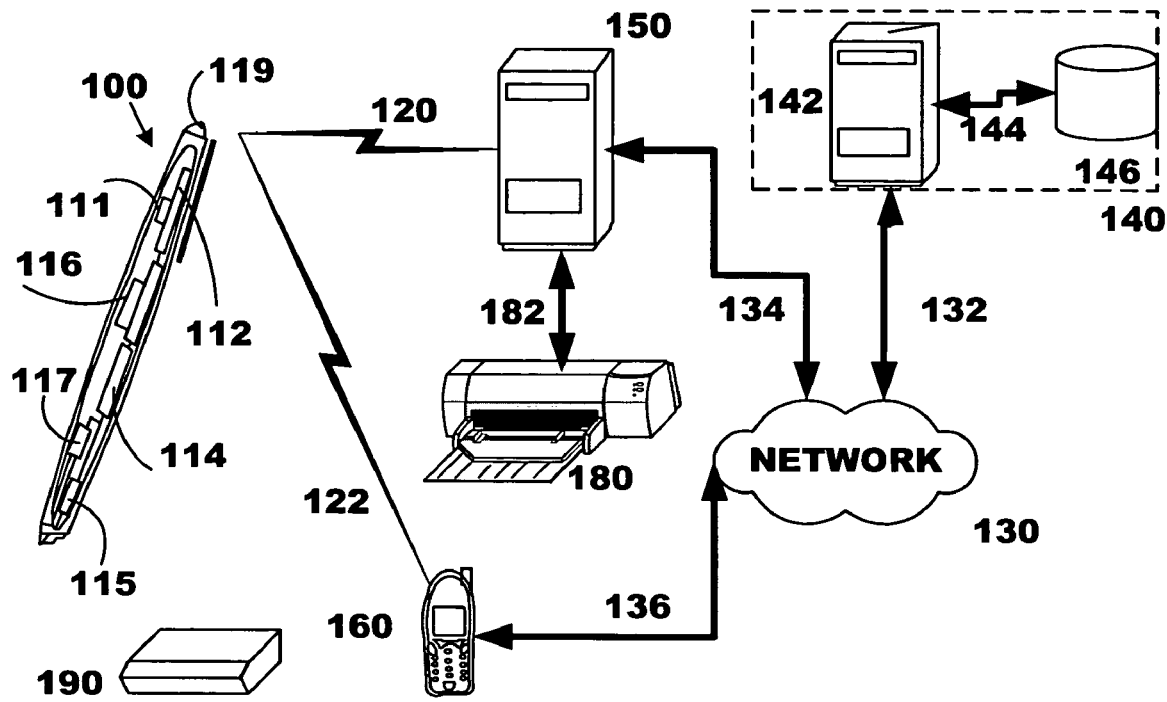
FIG. 1 is a schematic representation of a form verification system using a digital pen system according to an illustrative embodiment of the present application.

Referring to FIG. 1, an illustrative embodiment describing a digital pen form verification system is shown. Digital Pen 100 includes a processor 114, memory 112, ink 117, a camera or image sensor 115, a battery 116 and a wireless transceiver 111. The pen 100 includes an LED 119. It also includes pen stroke data and biometric sensors (not shown). The pen 100 includes a pen tip (not shown) that writes using the ink 117. Writing sensors (not shown) provide data regarding the stroke such as pressure, speed and pen attitude. The memory 114 includes a non-volatile memory. The pen 100 includes a wireless transceiver 111 that is a BLUETOOTH transceiver. Alternatively, other wireless communication channels can be utilized. In another alternative, a wired communications channel such as a docking station may be utilized in addition to or as a replacement for the wireless transceiver. The pen 100 provides biometric data relating to the pen strokes used including hand speed, pen tip pressure and the inclination angle between pen and paper. Other identifying information may be utilized including registering a pen to a user or using finger print scans. The 100 pen is assigned a unique identification code that is a unique serial number for the pen.

The system includes at least one pen 100 that establishes a personal area network using BLUETOOTH. The paired device may be a BLUETOOTH router or other processor 150 that connects to the digital pen 100 using wireless connection 120 and provides a gateway using communications connection 134 to a network 130 such as the Internet. The paired device may also include a cellular telephone or PDA 160 that has a BLUETOOTH connection 122 and a connection 136 to the network 130.

The system also includes a server 140 having storage 146 connected by connection 144 to processor 142. The server 140 is connected to the network 130 using communications channel 132. The server hosts a form version database, form database, and a packing item database that includes item weight information. Alternatively, processor 150 or cellular device 160 includes the databases and at least portions of the databases may be uploaded to pen 100. Server 140 is also utilized for other digital pen back end activities including pen stroke data analysis and background pattern lookup services. Alternatively, those other services may be performed locally at processor 150.

The system determines pen position information in terms of approximate radial distance of the transceiver to the BLUETOOTH access point. Position information may also be processed into strokes or transmitted in a separate data stream. Alternatively, and as applicable to all of the embodiments, pen position can be determined using a number of other methods. For example, the pen may be docked for data upload and the location of the docking station may be known. Additionally, the pen may be paired with a device having a known location that is discernable from another location of interest. Accordingly, pen location information may be absolute or relative.

The system includes a printer 180 connected to process 150 using communications channel 182. The printer 180 is used to print forms such as packing list forms and is optionally utilized to print digital paper patterns. The system also includes a scale 190 that is connected to the processor 150 using a wireless connection, but alternatively a wired connection may be used.

In at least one embodiment, all of the communications connections utilize appropriate security measures. Similarly, other well-known input devices, servers, processors, networks and communications mechanisms may be used. A back-end application may be utilized to process pen strokes. The back end application then recognizes command strokes or strokes in command locations identified by the pattern. The data written by a user in a particular data input field can be processed using well known ICR engines that are used with digital pens in order to identify the data written by the user. Processor 150 utilizes a mobile Pentium 4 processor and Windows XP. The server processors are geographically and load balanced application servers using systems available from Sun Microsystems and the storage servers use multiple location redundant backup systems. Additionally, other appropriate wireless and wired networks and connections may be utilized. It is contemplated that other communications channels such as OC-3 lines or wireless connections could be used in place of the T1 lines. Similarly, the other communications channels could be replaced with alternatives. As can be appreciated, various communication flows may be utilized, some of which will be chattier than others. The system may alternatively use any pen or stylus like device that provides for electronically recording strokes.

Figure 2:
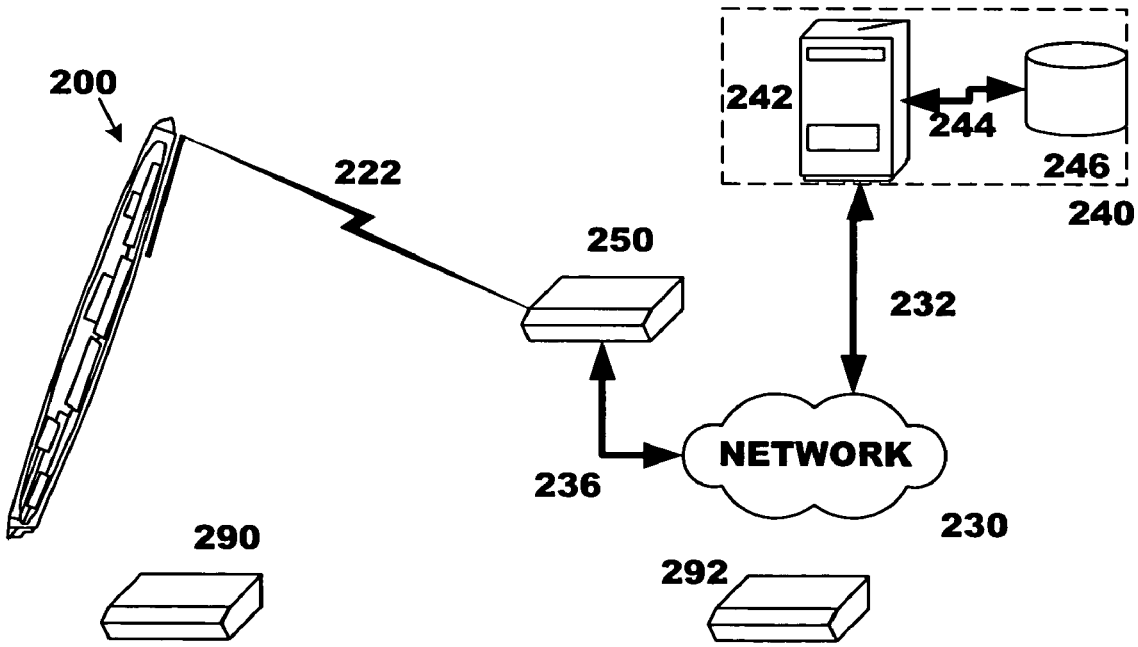
FIG. 2 is a schematic representation of a form verification system using a digital pen system according to another illustrative embodiment of the present application.

Referring to FIG. 2, another illustrative embodiment describing a digital pen form verification system is shown. Digital Pen 200 includes a BLUETOOTH transceiver. The system includes at least one pen 200 that establishes a personal area network using BLUETOOTH. The paired device may be a BLUETOOTH router or other processor 250 that connects to the digital pen 200 using wireless connection 220 and provides a gateway using communications connection 236 to a network 230 such as the Internet.

The system also includes a server 240 having storage 246 connected by connection 244 to processor 242. The server 240 is connected to the network 230 using communications channel 232. The server hosts a form version database, form database, and a packing item database that includes item weight information. The server also hosts an assembly form database including records for each form indicating the location of test sites for items to be tested and checked by an operator. Alternatively, processor 250 includes the databases and at least portions of the databases may be uploaded to pen 200. Server 240 is also utilized for other digital pen back end activities including pen stroke data analysis and background pattern lookup services. Alternatively, those other services may be performed locally at processor 250.

The system determines pen position information in terms of approximate radial distance of the transceiver to the BLUETOOTH access point. Position information may also be processed into strokes or transmitted in a separate data stream. The system includes a first test site 290 at a first location and a second test site 292 at a second location such that the location can be distinguished sufficiently to locate the digital pen 200 as in the general location of one of the test sites.

Figure 3:
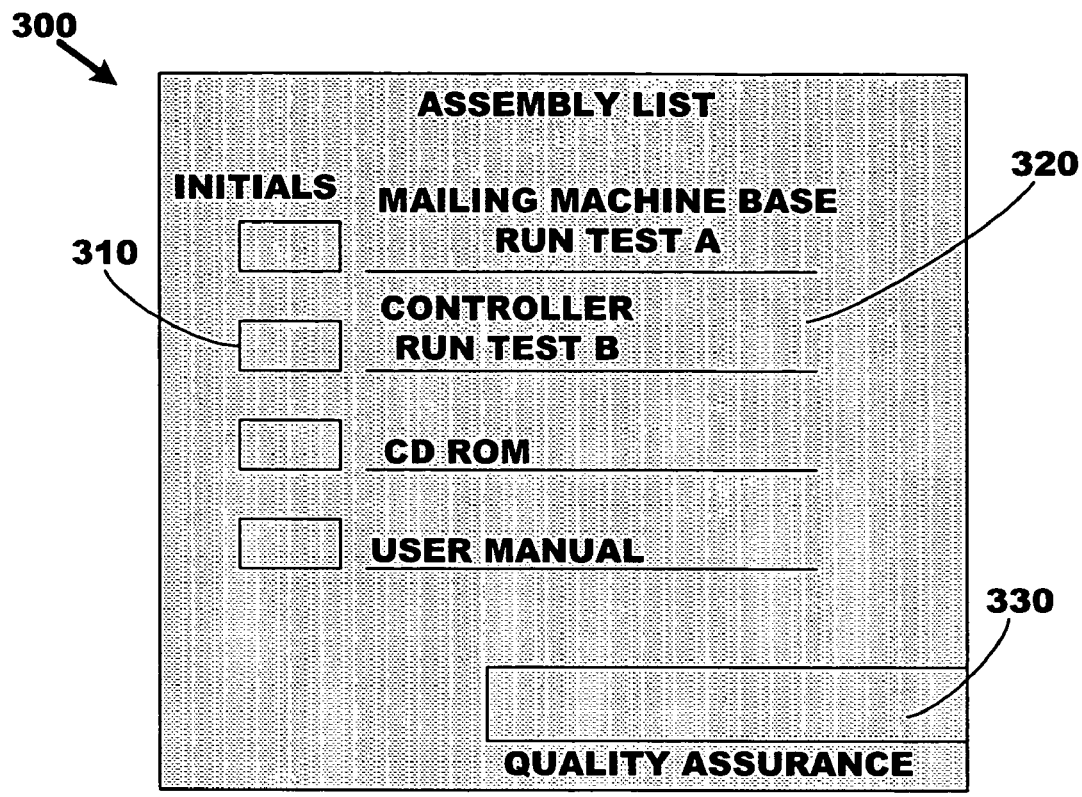
FIG. 3 is a schematic representation of an assembly list form according to an illustrative embodiment of the present application.

Referring to FIG. 3, a schematic representation of an assembly list form 300 according to an illustrative embodiment of the present application is shown. Form 300 includes a digital paper pattern and includes boxes 310 for user initials next to each item in the assembly list. Alternatively, check boxes may be used. The form 300 includes an assembly item list 320 having several assembly items that include instructions such as "run test A" on the mailing machine base. Referring to FIG. 2, a representative system is shown having two distinct testing locations 290, 292. In this embodiment, test A should be run at only location 290 and test B should be run only at location 292. A quality assurance signature box 330 is provided. Using the digital paper pattern and digital pen 200, the system can verify the user using biometric or other identifying information.

Figure 4:
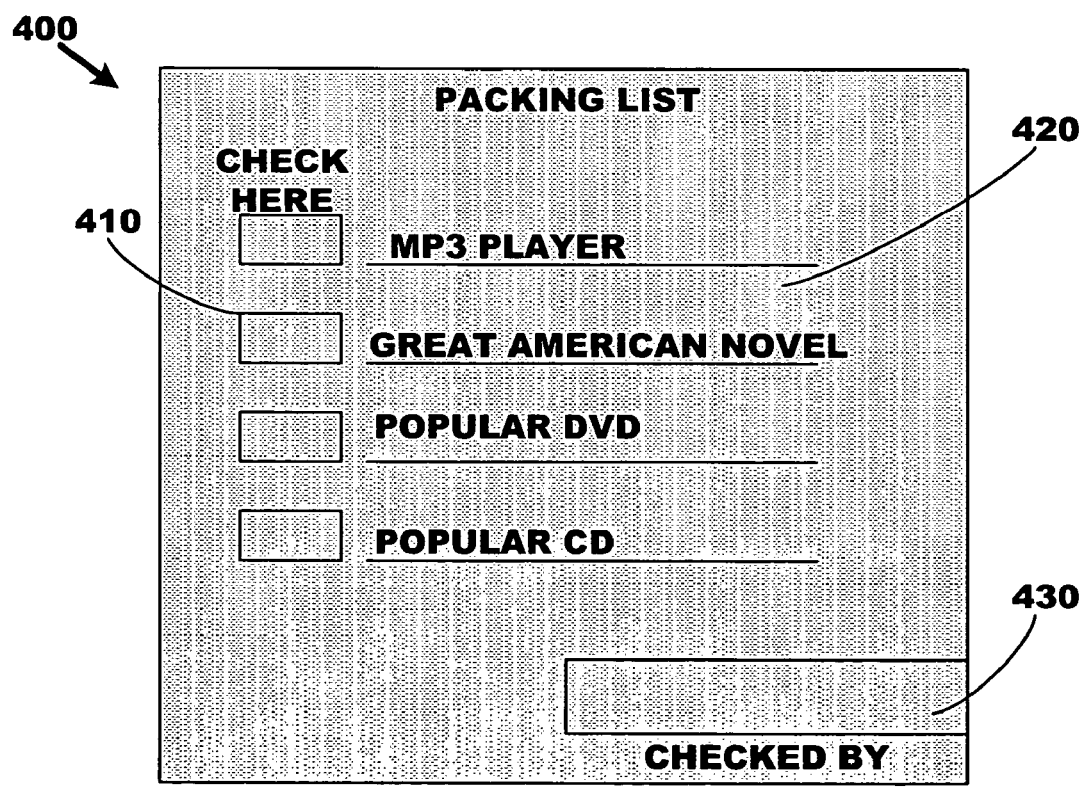
FIG. 4 is a schematic representation of a packing list form according to an illustrative embodiment of the present application.

Referring to FIG. 4, a schematic representation of a packing list form 400 according to an illustrative embodiment of the present application is shown. Form 400 includes a digital paper pattern and includes boxes 410 for user checks next to each item in the packing list for use when the item is picked from a warehouse bin and placed into a shipping container. Referring to FIG. 1, in at least one embodiment, the packing container is placed on scale 190. An association with the digital pen 100 may identify the user. The form 400 includes a packing item list 420 having several assembly items such as "MP3 Player." A quality assurance signature box 430 is provided.

Figure 5:
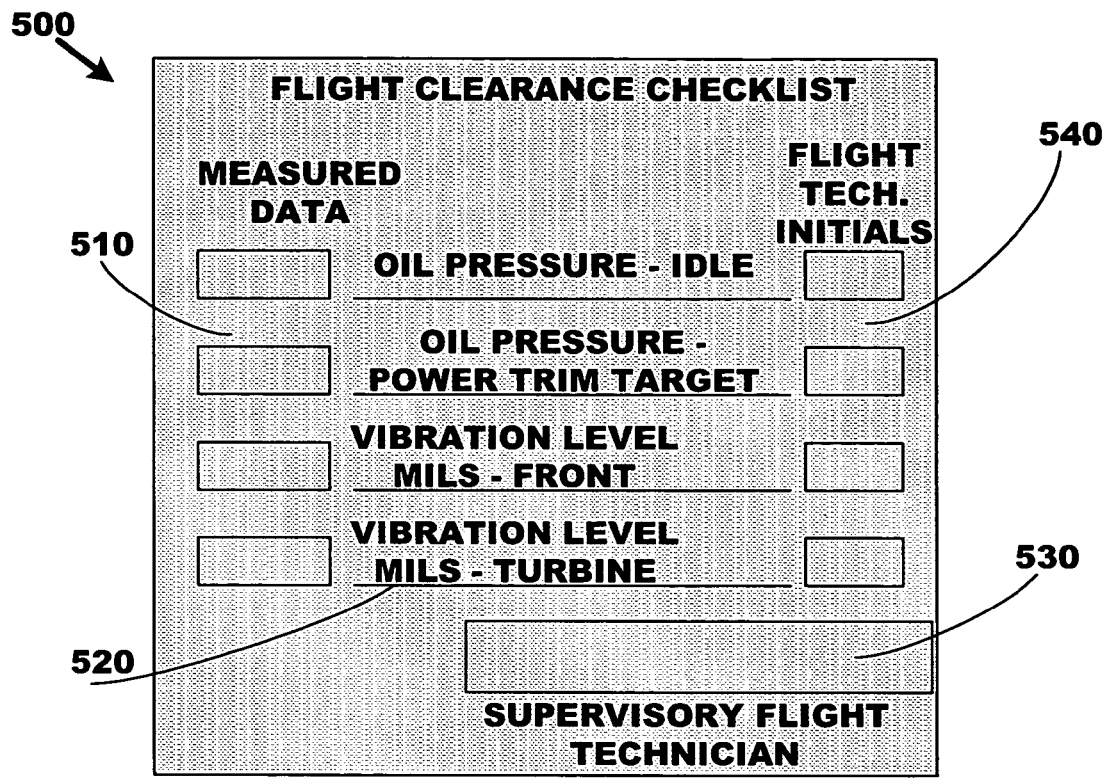
FIG. 5 is a schematic representation of a maintenance checklist form according to an illustrative embodiment of the present application.

Referring to FIG. 5, a schematic representation of a maintenance checklist form 500 according to an illustrative embodiment of the present application is shown. Form 500 includes a digital paper pattern and includes user initial boxes 540 for each test measurement. The form 500 includes measured data boxes 510 for each item to be measured and test line items 520 describing each measured test data point. As with the other embodiments, an intelligent character recognition (ICR) system is used to convert handwritten data into computer text for processing. The test technician enters the measurement for each line item and then initials the form. As discussed below, the system can determine whether the user entered the data and initials in the proper order and within an anticipated time window determined from the test database stored in system 240 or 250. For example, it may take 5 minutes to bring the engine from idle up to the power trim target. Therefore, if the user initials in the second box of 540 where entered earlier than 5 minutes from the first initials, a timing inconsistency can be flagged. Biometric data, handwriting recognition or other association with the digital pen 200 may identify the test technician. A quality assurance signature box 530 for a flight technician supervisor signature is provided.

Figure 6:
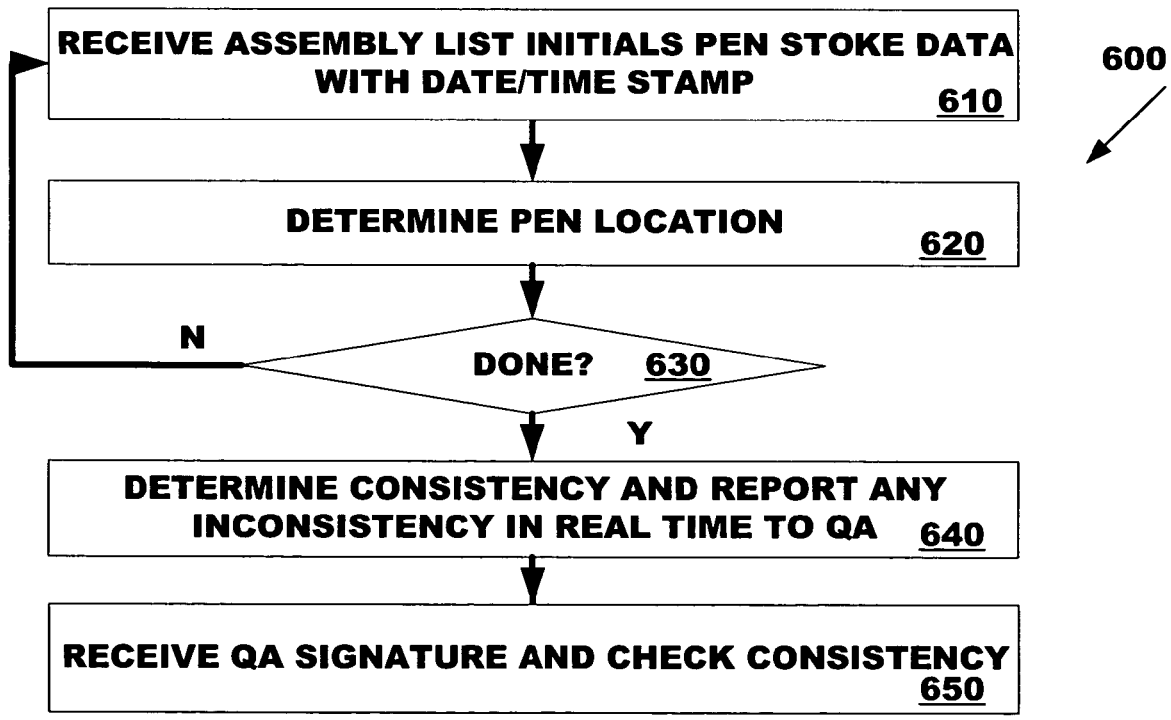
FIG. 6 is a flow chart showing a process for verifying an assembly list according to an illustrative embodiment of the present application.

Referring to FIG. 6 is a flow chart showing a process 600 for verifying an assembly list according to an illustrative embodiment of the present application is shown. With reference to FIGS. 2 and 3, the illustrative use of an assembly list is described to provide real-time form verification. In step 610, the system processor 240 receives pen stroke data that identifies a particular assembly form, pen user, pen ID and includes a date/time stamp. In step 620, the system determines the current pen location and logs the pen location information with the pen stroke record associated with that assembly list line 320. In step 630, the process continues to receive data in a push or pull format from the pen until the form is complete. The system infers the form complete condition when the final initials are entered. Alternatively, the form includes a form complete check box that allows the process to proceed from step 630.

In step 640, the system processor 240 accesses the assembly form database to determine that test A was to be performed. The system then determines that test A should be performed at location 290. The system then checks the pen stroke data for the first entry line of form 400 to determine if the pen location data is consistent with test location 290. If there is an inconsistency, the inconsistency is reported to the QA professional in real time to be used in the quality assurance determination before the signature is entered in step 650. Additionally, time consistency data may be measured against a database of expected duration for each operation on the assembly list. Alternatively, the processing may be performed at processor 250.

Figure 7:
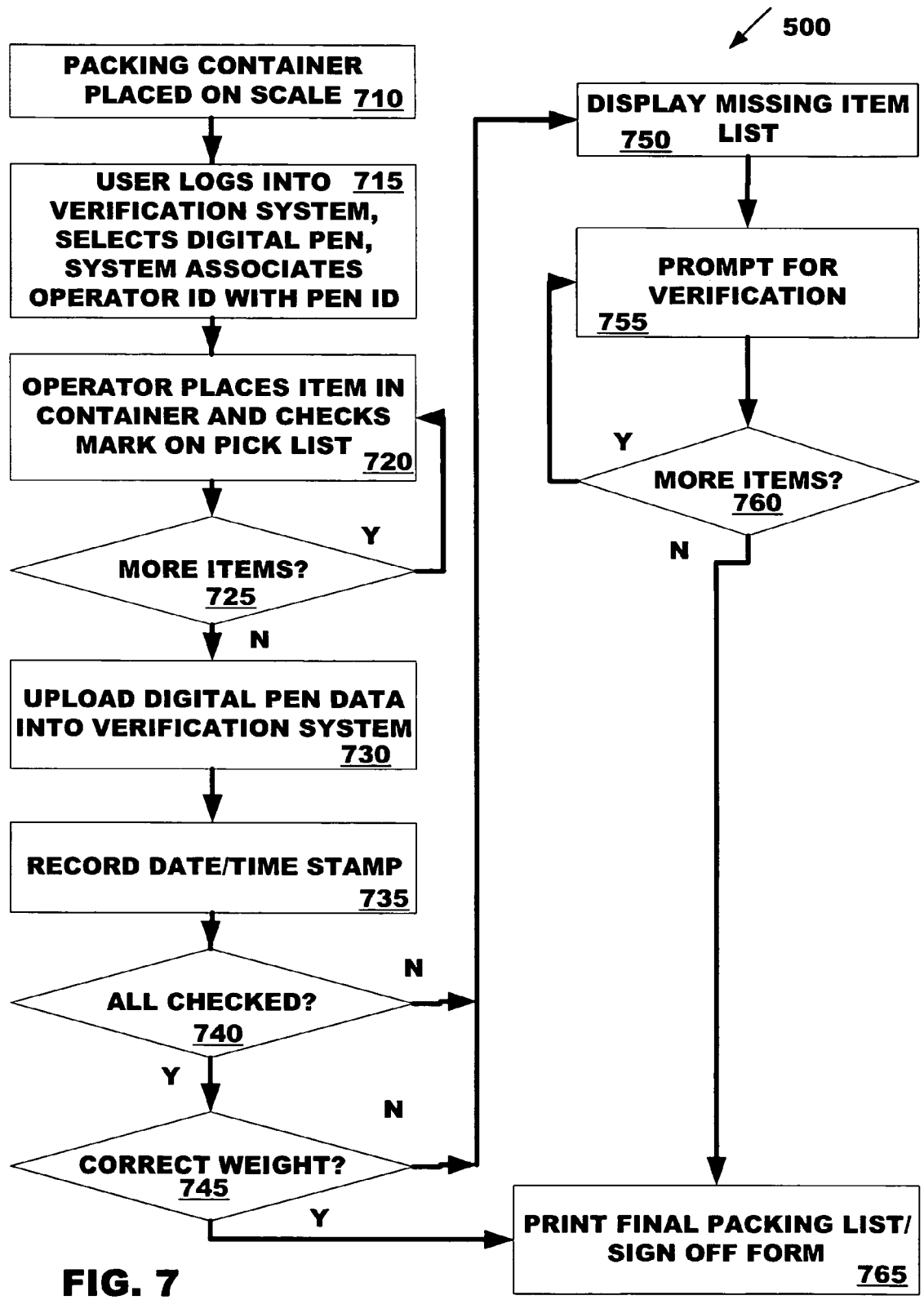
FIG. 7 is a flow chart showing a process for verifying a packing list according to an illustrative embodiment of the present application.

Referring to FIG. 7, a flow chart showing a process 700 for verifying a packing list according to an illustrative embodiment of the present application is shown. With reference to FIGS. 1 and 4, the illustrative use of a packing list form 400 is described to provide real-time form verification. In step 710, the user places a packing container on a scale 190. In step 715, the user logs into the verification system, selects a digital pen and enters a user ID in order to associate the unique pen ID with the user. In step 720, the user reads the pick list 400 and selects the first item on the list from a warehouse bin. The user then places that item in the packing container and checks the appropriate check box on form 400. In step 725, the system continues to gather digital pen data obtained from using the form 400 until there are no more items to pick. The form includes a form complete check box that allows the process to proceed from step 725.

In step 730, the system uploads the digital pen data into the verification system processor. Alternatively, the digital pen stroke data may be transmitted as soon as the strokes are completed. The real time notification in this instance describes providing discrepancy information to the packing operator and the Quality Assurance operator before the packing container leaves the packing station and scale 190. In step 735, the system records a time stamp and proceeds to the verification steps. In step 740, the system determines whether all the boxes were checked. If not, the error condition is reported to the operator in step 750 and the missing checks used to generate a missing item list. If all the boxes are checked, a second verification is performed in step 745 by checking the expected box weight for the items on the form with the actual weight read using the scale 190. If the weight is not correct, the system proceeds to step 750 to display a missing list. If the difference in expected weight from actual weight identifies one item weight, the system prompts the user first to check for that item. The prompts continue in steps 755 and step 760 until all the items are verified. The system then proceeds to print a final packing list/sign off form in step 765.

Figure 8:
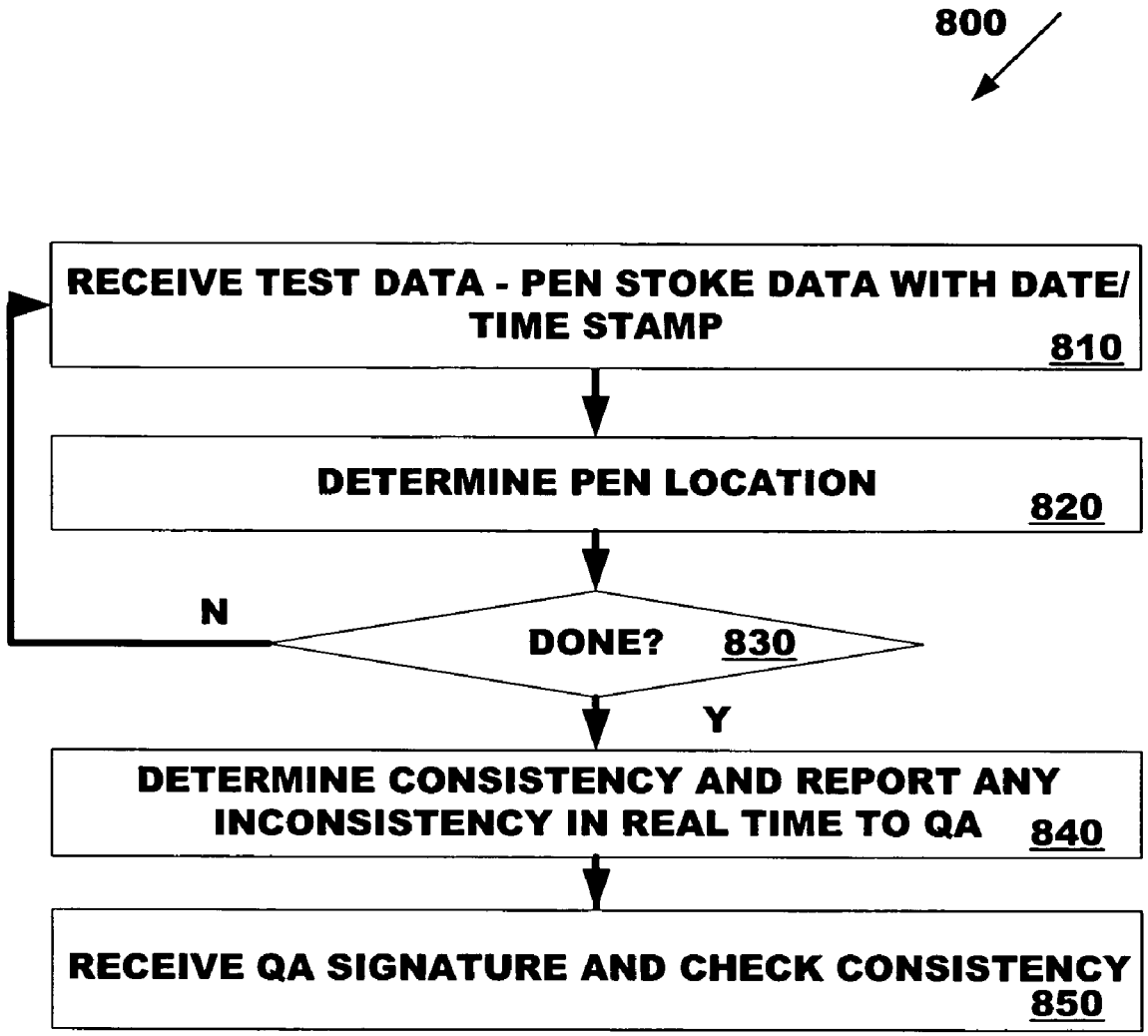
FIG. 8 is a flow chart showing a process for verifying a maintenance form according to an illustrative embodiment of the present application.

Referring to FIG. 8, a flow chart showing a process 800 for verifying a maintenance form according to an illustrative embodiment of the present application is shown. With reference to FIGS. 2 and 5, the illustrative use of a flight clearance test data checklist form 500 is described to provide real-time form verification. In step 810, the system processor 240 receives pen stroke data that identifies a particular maintenance form, pen user, pen ID and includes a date/time stamp. In step 820, the system determines the current pen location and logs the pen location information with the pen stroke record associated with that test line 520. In step 830, the process continues to receive data in a push or pull format from the pen until the form is complete. The system infers the form complete condition when the final initials are entered. Alternatively, the form includes a form complete check box that allows the process to proceed from step 830.

In step 840, the system processor 240 accesses the test form database to determine that oil pressure—power trim target was performed after the oil pressure test at idle. The system then determines that the second test should be performed at least 10 minutes after the first. The system then checks the pen stroke data for the first entry line of form 500 against the data for the second entry to determine if the pen time data is consistent with the test database. If there is an inconsistency, the inconsistency is reported to the supervisory flight technician professional in real time to be used in the quality assurance determination before the signature is entered in step 850. Additionally, the actual test data entries may be measured against a database of expected values for each test on the list. Alternatively, the processing may be performed at processor 250.

In at least one embodiment of verifying a packing list form, the packing container is placed on a scale as it is being loaded. The system predetermines or determines in real time the expected weight of the container using a database of records that includes weight information for at least some of the items. If the weight information is known, the verification software running on the verification server determines how much the fully packed container should weigh. The system reads the actual weight from the scale and compares the two values. If there is a discrepancy such as a lower weight than expected, the operator is prompted to check the container. If the list of items is such that the difference in weight is equal or close to the weight of only one item, the system would prompt the operator to first check that item.

In alternative embodiments, the digital pen utilizes ink that is machine detectable. In yet another embodiment, the ink is invisible. In an alternative, the pen includes other visual indicators such as an LCD display. In another alternative, the pen includes audio indicators such as a speaker, buzzer or speech synthesizer. In yet another embodiment, other feedback devices such as tactile feedback are provided. In another alternative, the pen includes audio input/output including synthesized voice output and voice recognition. Visual output is provided using an LCD display and LEDs and tactile feedback is provided using servomechanisms. Physical input includes an input button.

In another alternative embodiment, labels on the items to be packed also include an ANOTO digital pattern and checkbox so that they may be checked as the operator places them in the packing box. The packing box also includes an ANOTO digital pattern and checkbox so that the operator may check the same box on the packing box for each item that is inserted.

In another alternative embodiment, an RFID tag system with readers positioned to read the packing box ID and the ID of each item inserted is utilized to maintain a running list of items as they are placed in the packing box. In yet another alternative embodiment, a daily total of items shipped is maintained and provided to a Warehouse Management System to facilitate replenishment orders.

While the embodiments are described with reference to assembly list, packing list and maintenance form systems, the processes and mechanisms described may be utilized in other systems as well. For example, systems for identifying the version of a form have been described. For example, commonly-owned, co-pending U.S. patent application Ser. No. 10/065,283, published on Apr. 4, 2004 as U.S. patent application Publication No. 2004/0064486A1 by Braun, et al., describes systems for identifying the version of a form using an ANOTO pattern and digital pen and is incorporated herein by reference. In an alternative applicable to any of the embodiments described, the version of the form is identified during use and if out of date, remedial action taken if appropriate.

The present application describes illustrative embodiments of a system and method for providing verification of form input. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A method for providing real-time form data verification comprising:
   receiving pen stroke data processed by using an assembly form with at least one assembly form item line associated with at least one assembly item, wherein the pen stroke data identifies the assembly form item line and includes time data;
   determining an approximate absolute physical location of the pen;
   associating the pen stroke data with the at least one assembly form item line and the approximate absolute physical location of the pen;
   determining an expected data value associated with the assembly item;
   determining a measured data value; and
   comparing the expected data value with the measured data value, wherein
   the expected data value comprises a retrieved weight value associated with the at least one assembly form item line; and
   the measured data value comprises a measured weight value associated with the at least one assembly form item line.

2. The method of claim 1, further comprising:
   using the comparison to determine whether a data inconsistency exists and if a data inconsistency exists, reporting the inconsistency.

3. The method of claim 1, wherein,
   determining a measured data value is performed using the pen stroke data.

4. The method of claim 1, wherein,
   determining a measured data value is performed using the approximate absolute physical location of the pen.

5. The method of claim 1 wherein the pen stroke data is received from a digital pen.

6. The method of claim 1, wherein:
   the approximate absolute physical location of the pen is determined with reference to a known transceiver location.

7. The method of claim 1, further comprising:
   determining whether the approximate absolute physical location of the pen is consistent with the at least one assembly form item line.

8. The method of claim 1, further comprising:
   determining whether the time data is consistent with the at least one assembly form item line.

9. A method for providing real-time form data verification comprising:
   receiving pen stroke data processed by using an test form with at least one test item line associated with at least one test item, wherein the pen stroke data identifies the test item line and includes time data;
   determining an approximate absolute physical location of the pen;
   associating the pen stroke data with the at least one test item line and the approximate absolute physical location of the pen;
   determining an expected data value associated with the test item;

determining an expected test data value associated with the test item;

determining a user observed test data value using the pen stroke data;

determining a measured data value;

comparing the expected test data value with the measured test data value; and comparing the expected data value with the measured data value, wherein the expected data value comprises a retrieved weight value associated with the at least one assembly form item line; and the measured data value comprises a measured weight value associated with the at least one assembly form item line.

10. The method of claim 9, further comprising:

using the test data comparison to determine whether a data inconsistency exists and if a data inconsistency exists, reporting the inconsistency.

11. The method of claim 9, wherein, determining a measured data value is performed using the pen stroke data.

12. The method of claim 9, wherein, determining a measured data value is performed using the approximate absolute physical location of the pen.

13. The method of claim 9 wherein the pen stroke data is received from a digital pen.

14. The method of claim 9, further comprising:

using the data value comparison to determine whether a data inconsistency exists and if a data inconsistency exists, reporting the inconsistency.

15. The method of claim 9, wherein:

the approximate absolute physical location of the pen is determined with reference to a known transceiver location.

16. The method of claim 9, further comprising:

determining whether the approximate absolute physical location of the pen is consistent with the at least one test item.

17. The method of claim 9, further comprising:

determining whether the time data is consistent with the at least one test item.

18. A method for providing real-time form data verification comprising:

receiving pen stroke data processed by using a form with at least one form item associated with at least one item, wherein the pen stroke data identifies the form item;

determining an approximate physical location of the pen;

associating the pen stroke data with the at least one form item and the approximate physical location of the pen;

determining whether the approximate physical location of the pen is consistent with the at least one item;

determining an expected data value associated with the assembly item;

determining a measured data value; and comparing the expected data value with the measured data value, wherein the expected data value comprises a retrieved weight value associated with the at least one assembly form item line; and the measured data value comprises a measured weight value associated with the at least one assembly form item line.

19. The method of claim 18, wherein:

the approximate physical location of the pen is determined with reference to a known transceiver location.

\* \* \* \* \*

UNITED STATES PATENT AND TRADEMARK OFFICE
CERTIFICATE OF CORRECTION

PATENT NO.       : 7,609,890 B2                                                                Page 1 of 1
APPLICATION NO.  : 10/957459
DATED            : October 27, 2009
INVENTOR(S)      : Jean-Hiram Coffy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1378 days.

Signed and Sealed this

Twelfth Day of October, 2010

David J. Kappos
*Director of the United States Patent and Trademark Office*